United States Patent [19]
Gregor

[11] Patent Number: 5,855,303
[45] Date of Patent: Jan. 5, 1999

[54] WEAR INSERT FOR METERING SYSTEM

[75] Inventor: David Walter Gregor, Davenport, Iowa

[73] Assignee: Deere & Company, Moline, Ill.

[21] Appl. No.: 912,467

[22] Filed: Aug. 18, 1997

[51] Int. Cl.[6] .............................. G01F 11/10; A01C 3/06; B65G 19/18

[52] U.S. Cl. ......................... 222/368; 222/370; 239/654; 239/650; 198/735.3

[58] Field of Search ................................. 222/368, 370; 198/534, 735.3; 239/654, 650

[56] References Cited

U.S. PATENT DOCUMENTS

| | | | |
|---|---|---|---|
| 3,489,321 | 1/1970 | Kirschmann | 222/268 |
| 3,763,797 | 10/1973 | Navasero | 111/77 |
| 4,183,430 | 1/1980 | Hunter | 198/735.3 |
| 4,222,482 | 9/1980 | Kelley | 198/735.3 |
| 4,296,695 | 10/1981 | Quanback | 111/34 |
| 4,705,220 | 11/1987 | Gandrud et al. | 239/654 |
| 4,779,765 | 10/1988 | Neumeyer | 222/630 |
| 4,834,004 | 5/1989 | Butuk et al. | 111/200 |
| 5,006,228 | 4/1991 | Anderson et al. | 209/365.3 |
| 5,592,889 | 1/1997 | Bourgault | 111/174 |

FOREIGN PATENT DOCUMENTS 1313795  2/1993  Canada ................................ 111/33.1

OTHER PUBLICATIONS

Copending U.S. application No. 08/912472 entitled "Distribution Manifold for Air Seeder," filed Aug. 18, 1997.
Copending U.S. application No. 08/912473 entitled "Product Disconnect for Metering Device," filed Aug. 18, 1997.
Copending U.S. application No. 08/912474 entitled "Brush for Air Seeder Metering System," filed Aug. 18, 1997.
Copending U.S. application No. 08/912513 entitled "Removable Meter Cartridge for Metering System," filed Aug. 18, 1997.
Copending U.S. application No. 08/912470 entitled "Tank Pressurization System for Air Seeder," filed Aug. 18, 1997.
Copending U.S. application No. 08/914289 entitled "Reconfigurable Meter Roller and Blank Section," filed Aug. 18, 1997.

*Primary Examiner*—Andres Kashnikow
*Assistant Examiner*—Keats Quinalty

[57] ABSTRACT

A wear insert is provided for an air seeder metering system directing rising air away from product as it is metered from a product tank by the associated metering system. The wear insert has a lip which extends into the outlet of the metering system in order to divert air away from the path of metered product to prevent the product from bunching and to promote a continuous flow of product from the metering system.

6 Claims, 18 Drawing Sheets

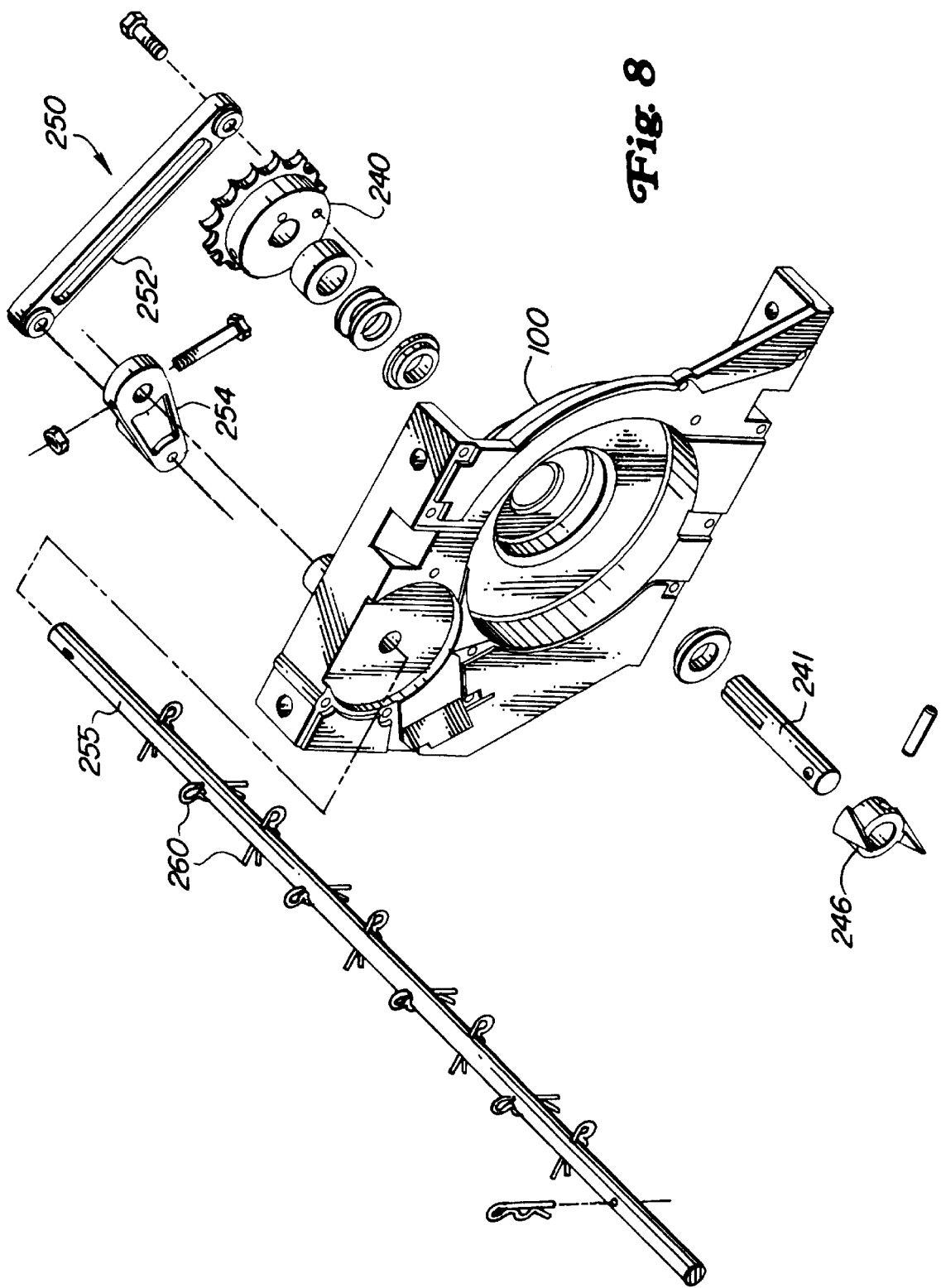

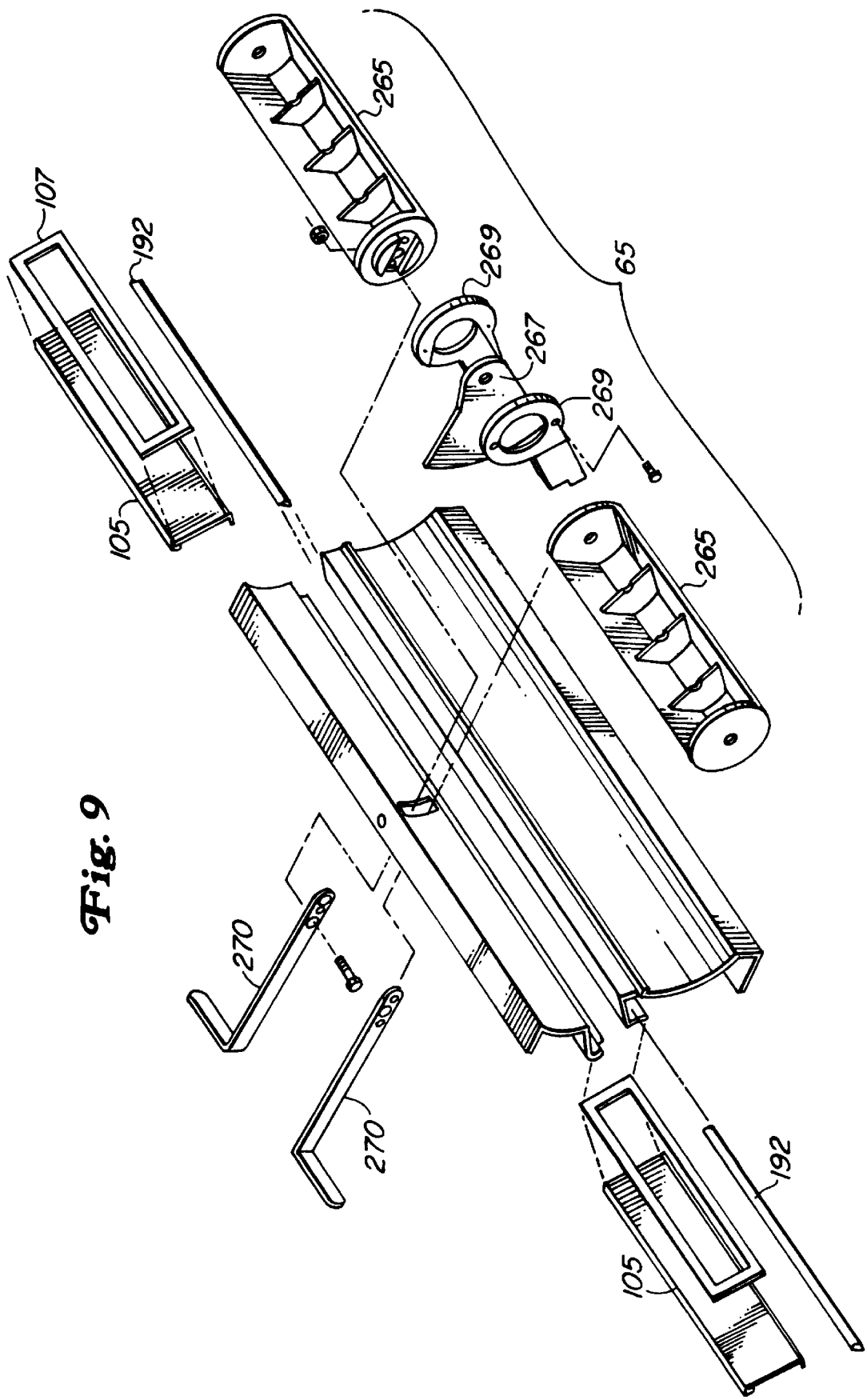

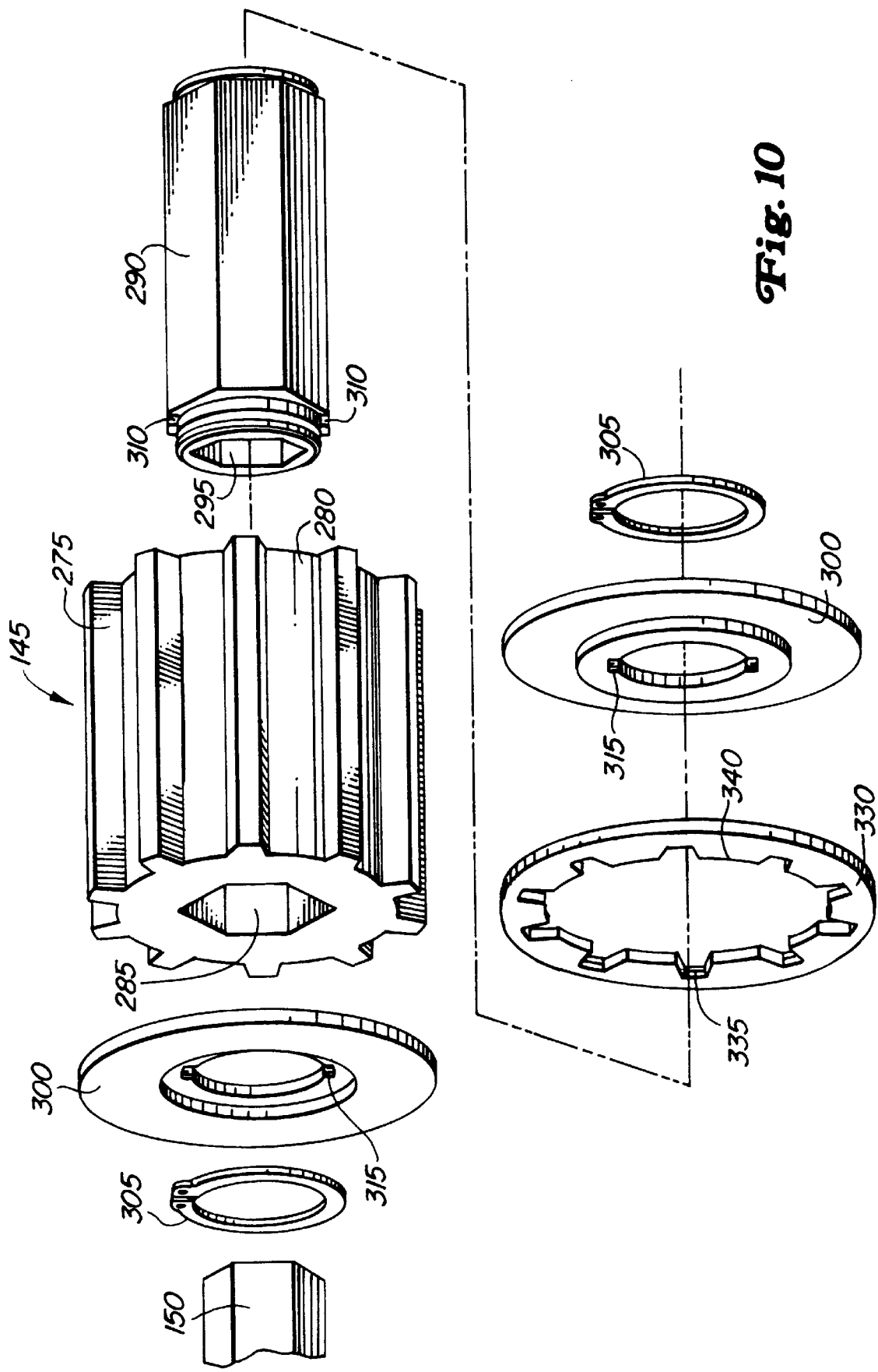

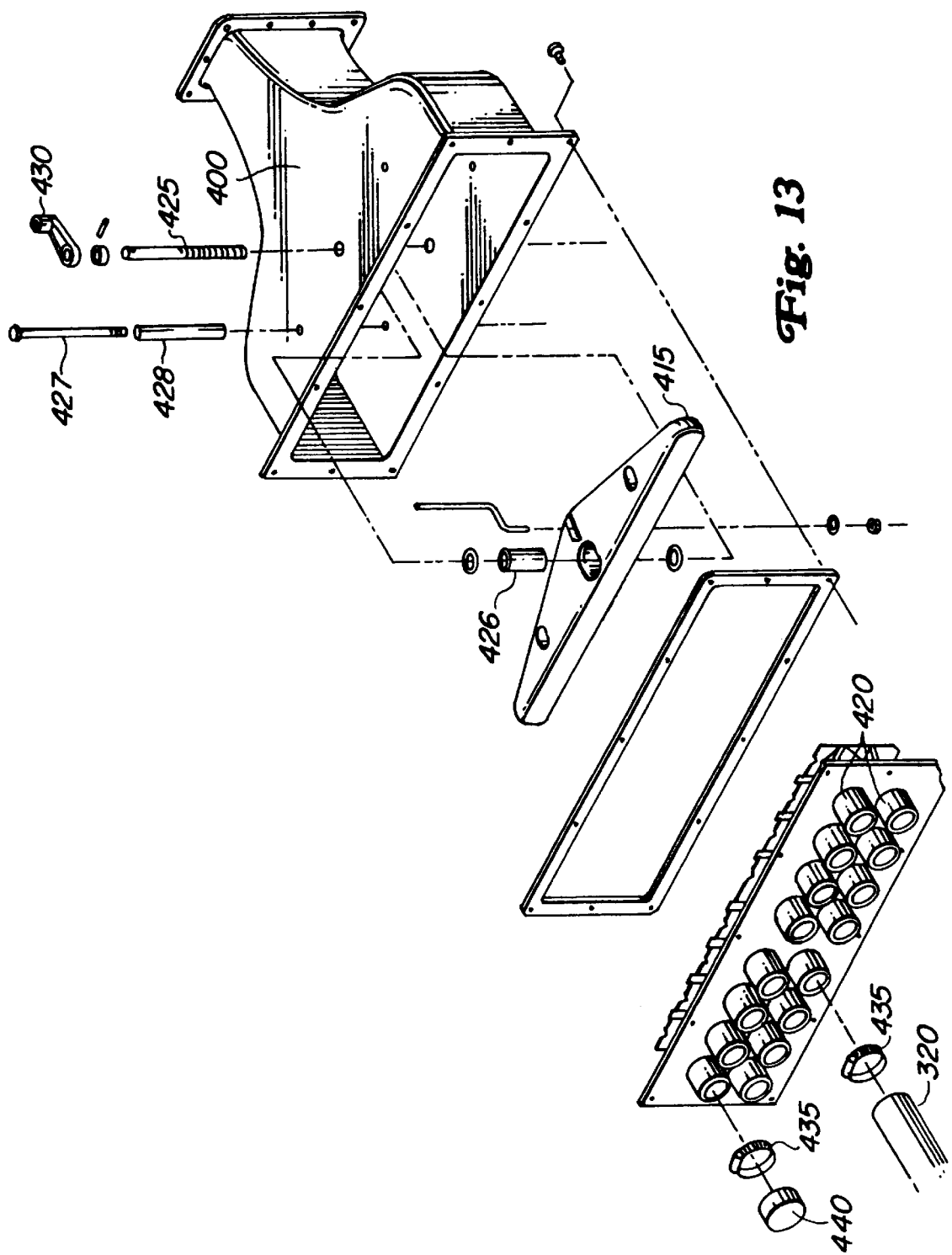

WEAR INSERT FOR METERING SYSTEM

FIELD OF THE INVENTION

The present invention relates to metering apparatus for air seeders, and more particularly to a wear insert attachable to a seed metering system for directing rising air flow away from a product path. A preferred embodiment of the invention relates to a metering system having a wear insert mounted in a meter casing for defining a volume of product metered by a meter roller and directing rising air flow away from the product path and toward an air diversion path.

BACKGROUND OF THE INVENTION

Air seeders and other seeding devices are commonly towed by tractors to apply seed or fertilizer, or both simultaneously, to a field. As an example, an air seeder may be towed in combination with a tilling implement, one behind the other, to place the seed and fertilizer under the surface of the soil. An air seeder has as its central component a wheeled seed cart which comprises one or more frame-mounted product tanks for holding product, generally seed or fertilizer or both. Air seeders also generally comprise a metering system for dispensing product from the tanks and a pneumatic distribution system for delivering the product from tank to soil.

It is known to provide an air seeder with volumetric meters which measure a fixed volume of seed per unit of linear distance. These volumetric meters typically comprise either augers or fluted cylinders (meter rollers) which rotate through a product reservoir to measure granular product, as illustrated in U.S. Pat Nos. 3,489,321 and 3,763,797. The meters rotate to feed product into a pneumatic distribution system. The pneumatic distribution system of an air seeder generally utilizes a centrifugal fan to provide at least one airstream which flows through the pneumatic distribution system to seed boots where product is deposited in the soil. Product is first introduced to the air stream by the metering system at a primary distribution manifold located below the metering system. Product is carried by the air stream through distribution lines to a series of secondary distribution manifolds ("headers"), which in turn distribute product through distribution lines to seed boots mounted behind ground openers on the tilling implement so that the product may be evenly delivered to the span of ground (the "tillage") acted upon by the tilling implement.

Operators of conventional seeding equipment often lose product to the tillage while the metering system is not operating, due to forces acting upon the product above the meter, including gravity and a lower pressure air stream running below the meter. The large central product tanks of an air seeder may lose substantial amount of product. One method of preventing lost product includes the use of a device to shut off flow of product between a product tank and a meter. For example, U.S. Pat No. 4,834,004 discloses slides which may be used to shut off product to a metering system. However, some amount of product may still be lost after the meter is shut off and before the shut-off device is actuated. In addition, operators must remember to actuate the shut-off device each time a meter is stopped.

In addition, if the product tank above the meter is not pressurized properly, the pressure in the product tank may be lower than the pressure of the air flowing through the pneumatic distribution system below the meter. In such a case, product may attempt to flow from the pneumatic distribution system through the meter and into the product tank, even while the meter is running. Even momentary occurrences of this condition can prevent product from flowing smoothly into the pneumatic distribution system and instead causes the product to bunch and pulse as it leaves the meter.

Therefore, it is desirable to devise a metering system having a mechanism to prevent air from the pneumatic distribution system from substantially affecting metering of product while the air flows through the metering system in reverse. It is also desirable to devise such a mechanism which may be replaced with relative ease.

SUMMARY OF THE INVENTION

It is an object of the present invention to provide an improved mechanical metering system for metering product.

It is an additional object of the present invention to devise a wear insert for a metering system which directs rising air away from product as the product is metered.

It is a further object of the present invention to provide a wear insert capable of preventing product from bunching and helping to define the volume of product metered from the product tank to the pneumatic distribution system by the meter rollers, while not impeding accurate and continuous metering by the meter rollers.

According to the invention the objects are attained by providing a wear insert for a metering system disposed between a product tank and a primary distribution manifold of a pneumatic distribution system. The wear insert extends into the metering system's outlet to direct air flow (due to underpressurization of the product tank) away from a product path as product is metered.

The preferred embodiment of the present invention provides a urethane wear insert which is fixed in a meter casing so that a lip of the wear insert extends into the outlet of the meter casing for diverting air away from product as the product is metered. The width of the wear insert determines the distance between an inner wall of the meter casing and the meter roller, thus helping determine the volume of product metered.

In the following description the invention is explained in greater detail on the basis of a preferred embodiment with reference to the drawings.

BRIEF DESCRIPTION OF THE DRAWINGS

FIG. 8 is an exploded view of a right end plate of a meter housing and an agitator shaft.

FIG. 9 is an exploded view of a product disconnect.

FIG. 10 is an exploded isometric view of a meter roller and blank section according to a preferred embodiment of the present invention.

FIG. 11b is a perspective view of the wear insert of FIG. 11a.

FIG. 12b is a perspective view of the meter roller brush of FIG. 12a.

FIG. 13 is an exploded view of a plenum according to a preferred embodiment of the present invention.

FIG. 16b is a top view of the left bypass port half of FIG. 16a.

FIG. 16c is a side view of the left bypass port half of FIG. 16a.

FIG. 17b is a top view of the right venturi port half of FIG. 17a.

FIG. 17c is a side view of the right venturi port half of FIG. 17a.

DETAILED DESCRIPTION OF THE PREFERRED EMBODIMENT

Figure 1:
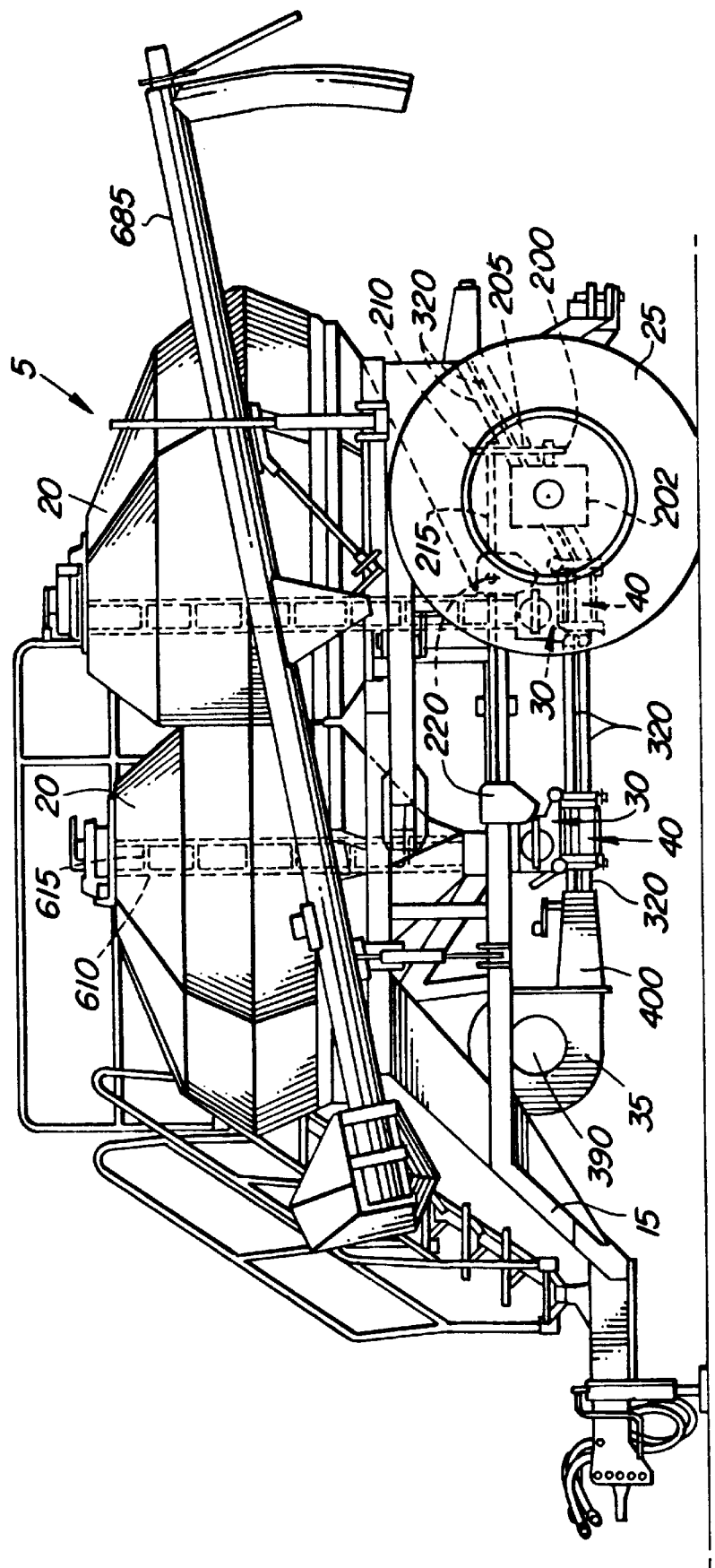
FIG. 1 is a left side elevational view of an air seeder constructed according to a preferred embodiment of the present invention.
Figure 2:
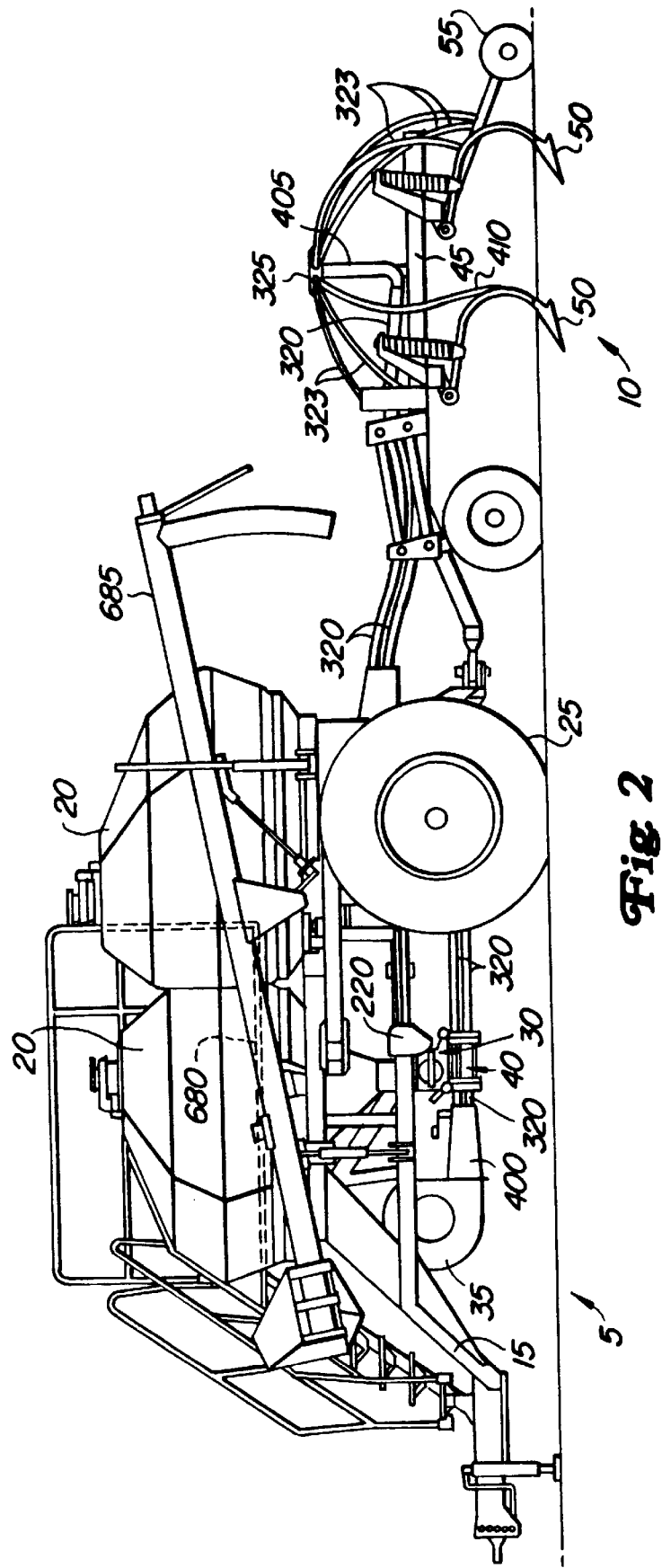
FIG. 2 is a left side elevational view of the air seeder of FIG. 1 towing a tilling implement.
Figure 3:
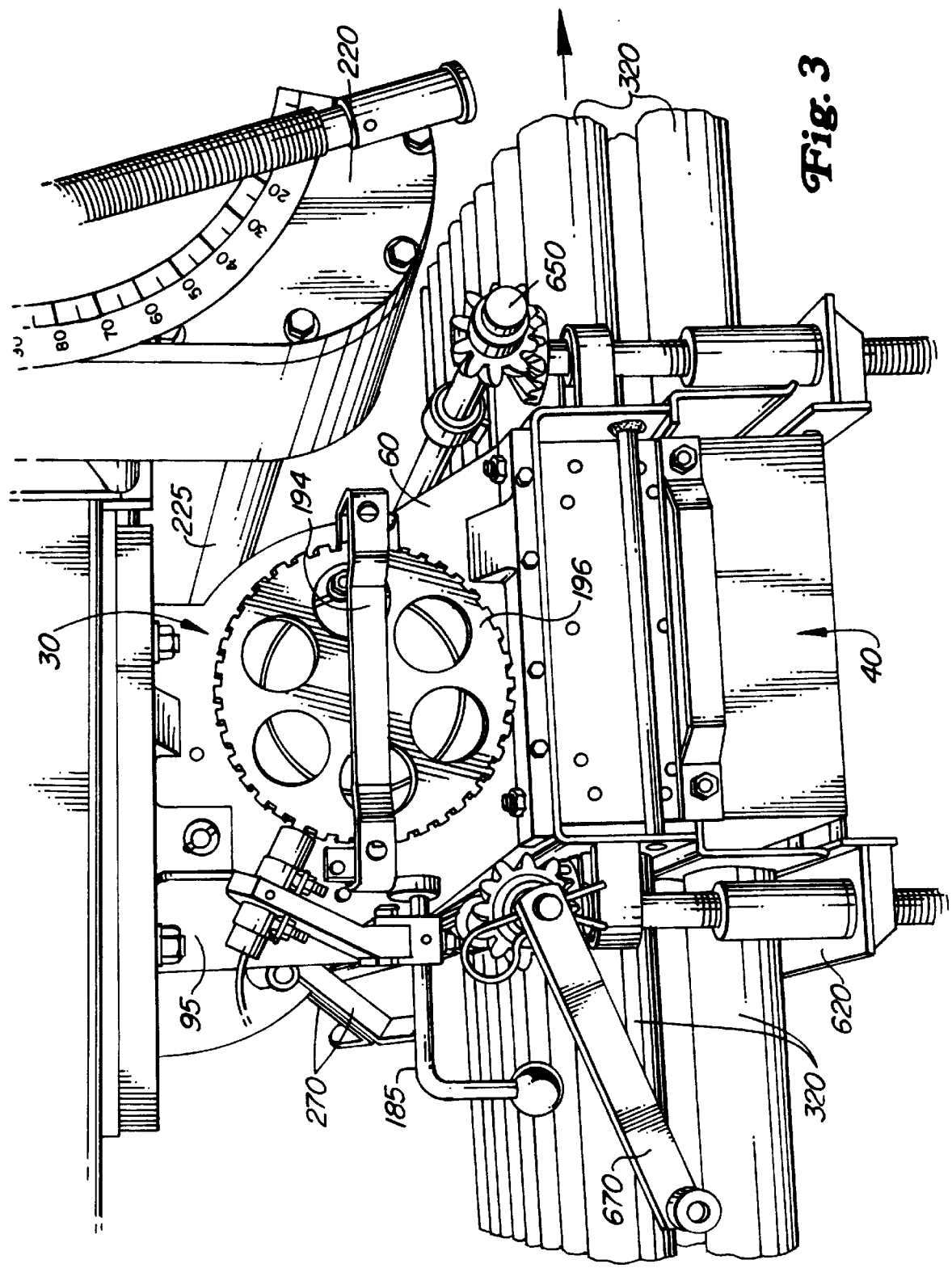
FIG. 3 is a left side perspective view of a metering system constructed according to a preferred embodiment of the present invention.
Figure 4:
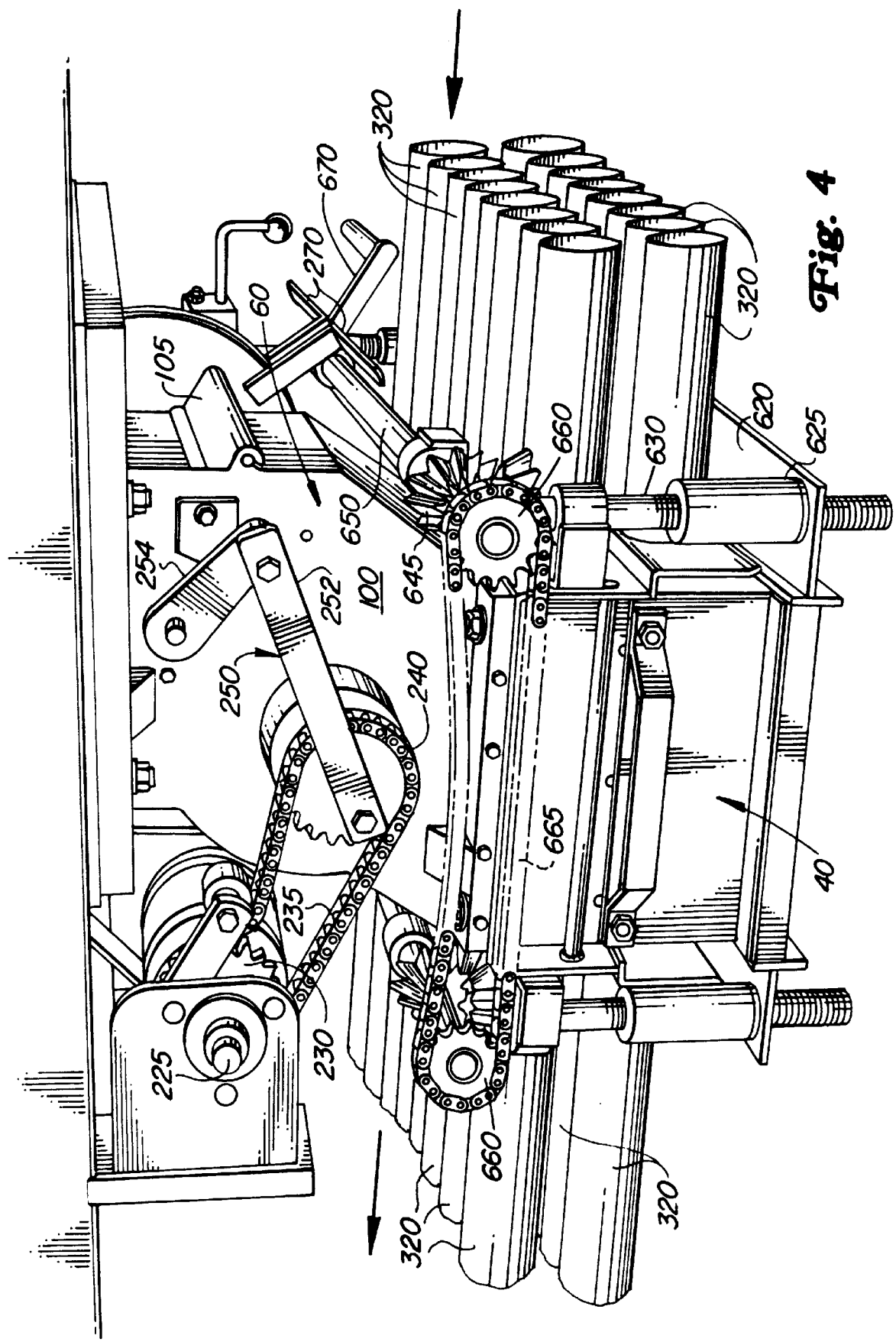
FIG. 4 is a right side perspective view of a metering system constructed according to a preferred embodiment of the present invention.

An air seeder constructed according to a preferred embodiment of the present invention is shown in FIGS. 1–18. With reference to FIGS. 1–2, an air seeder is shown comprising a seed cart 5 towed between a tractor (not shown) and a tilling implement 10. The seed cart 5 has a frame 15 to which product tanks 20 and wheels 25 are mounted. Each product tank 20 has an associated metering system 30 at its lower end for controlled feeding of product into a pneumatic distribution system 35 at a primary distribution manifold 40. The tilling implement 10, towed behind the seed cart 5, consists generally of a frame 45 to which ground openers 50 are mounted. Incorporation of seed row finishing equipment such as packers 55 is also desirable in many applications.

Referring now to FIGS. 3–7, one of the metering systems 30 of the present invention is shown comprising a meter housing 60 which surrounds a product disconnect 65 and a meter cartridge 70. The meter housing 60 comprises a top plate 75 which has a product entrance slot 80, front and rear side panels 85, 90, left and right end plates 95, 100, and hinged cleanout doors 105, having door seals 107 (FIG. 9), on the front side panel 85. The left end plate 95 is provided with a cartridge removal opening 110. The top plate 75 connects the front and rear side panels 85, 90 and left and right end plates 95, 100 to form a product disconnect chamber 115, a product cleanout chamber 120, and a meter chamber 125 with product discharge slots 130 at its lower end. Preferably, there is a product discharge slot 130 for each run in the primary distribution manifold 40.

Figure 5:
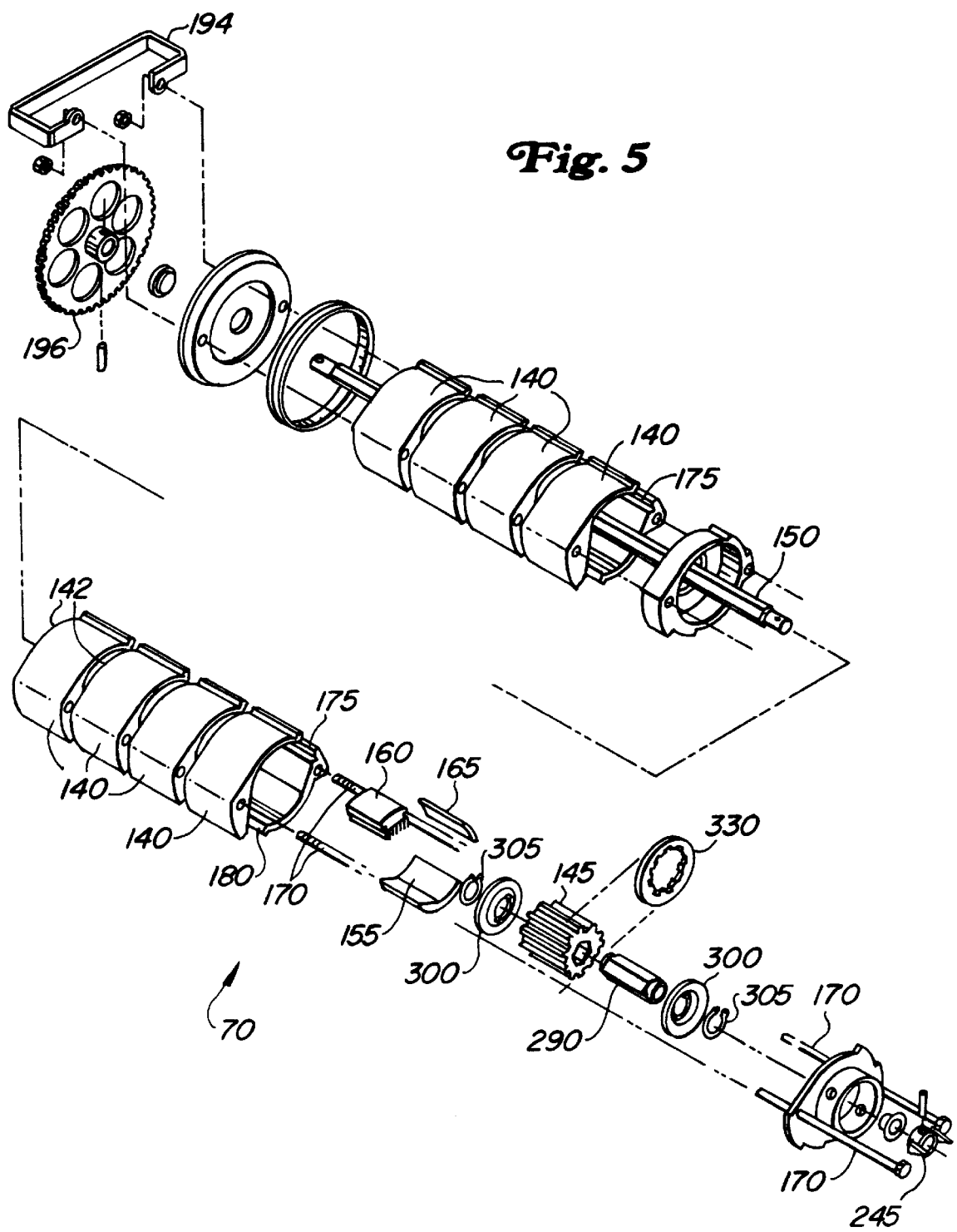
FIG. 5 is an exploded perspective view of a meter cartridge.
Figure 6:
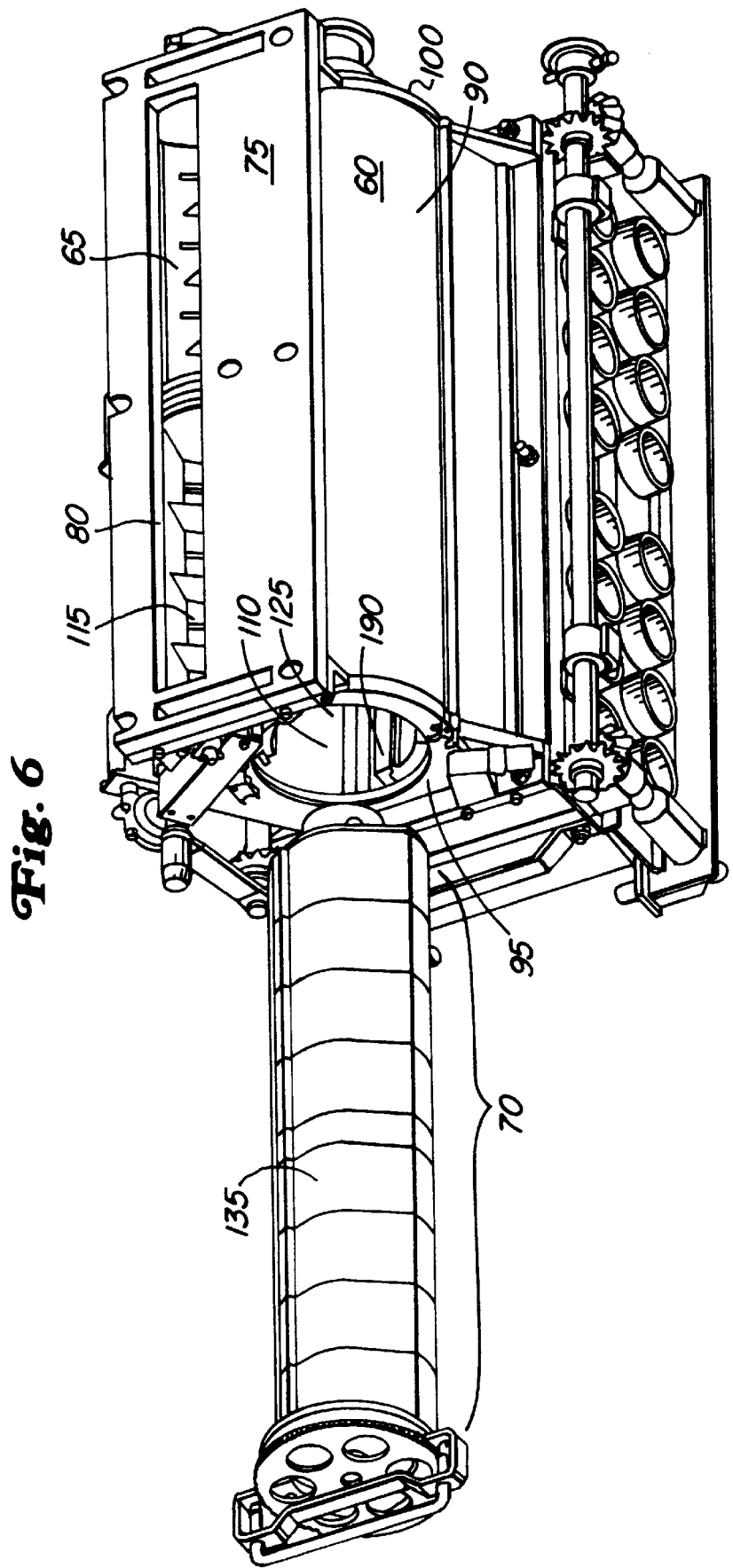
FIG. 6 is a perspective view of a meter housing and meter cartridge, the meter cartridge removed from the meter housing.

The meter cartridge 70 is housed in the meter chamber 125. Referring now to FIGS. 5 and 6, the meter cartridge 70 is shown comprising a casing 135, consisting of a plurality of casing sections 140 and a series of meter rollers 145. Preferably, one meter roller 145 and one casing section 140 are provided for each run in the primary distribution manifold 40. The meter rollers 145 are rotatably mounted in the casing 135, and rotate with a meter drive shaft 150. The casing sections 140 comprise a wear insert 155, a meter roller brush 160, and, when disabled, a door insert 165. The casing sections 140 are held together by cartridge rods 170 which extends through the casing sections 140. Each of the casing sections 140 is provided with a casing inlet 175 for receiving product and a casing outlet 180 for dispensing product. In addition, casing sections 140 each have a wall 142 to isolate each casing section 140 from an adjacent casing section 140.

A handle 194 is mounted to an end of the meter cartridge 70 to assist the operator in removing the cartridge. The meter cartridge 70 is removable from the meter chamber 125 by releasing an over center cam 185 mounted to the meter housing 60, rotating the meter cartridge 70 to disengage the meter cartridge 70 from seals 190 within the meter housing 60, and sliding the meter cartridge 70 out of the meter housing 60. The meter cartridge 70 may then be replaced or reconfigured to a different setting corresponding to the setup of the tilling implement 10 and the type of product to be metered from the product tank 20. The operator can replace the meter cartridge 70 by sliding the meter cartridge 70 into the meter chamber 125, rotating the meter cartridge 70 until it encounters a cartridge positioning stop 195 in the meter housing 60, and engaging the over center cam 185, which assists the operator in rotating the meter cartridge 70 and locks the meter cartridge 70 in an engaged position against the seals 190.

The metering systems 30 are preferably ground driven so that substantially the same amount of product is applied per unit of linear distance despite variations in tractor speed. Referring now to FIG. 1, a sprocket 200, driven by one of the wheels 25 through a right angle gear box 202, is coupled by a chain 205 to a main drive shaft sprocket 210. The main drive shaft sprocket 210 is ratcheted to a main drive shaft 215 so that the main drive shaft 215 rotates only as the wheel 25 rotates in the direction corresponding to forward movement of the seed cart 5. The main drive shaft 215 is coupled to a ratio box 220 corresponding to each metering system 30. The ratio box 220 enables an operator to vary the rate of rotation of a transverse shaft 225 (seen in FIG. 3) with respect to the rate of rotation of the main drive shaft 215. The transverse shaft 225 driven by the ratio box 220 is in turn coupled to a transverse shaft sprocket 230 (seen in FIG. 4), which is connected by a meter drive chain 235 to a meter drive sprocket 240. The drive sprocket 240 is mounted on a short shaft 241 which has a drive fitting 246 mounted on the end opposite from the sprocket 240. the meter drive fitting 246 and meter drive 245 each has a pair of tapered fingers which extend parallel to the axis of rotation of their respective shafts and the fingers of each engage the fingers of the other. The meter drive shaft 150, which extends through the meter rollers 145 in the meter cartridge 70, is connected to the meter drive fitting 246 by a meter drive 245, causing the meter rollers 145 to turn (and meter product) as the seed cart 5 travels forward and the wheel 25 rotates.

Referring now to FIG. 8, one end of an agitator drive 250, comprising a pitman 252 and a crank 254, is fixed off-center to the meter drive sprocket 240 and secured at the other end to an agitator shaft 255, causing the agitator shaft 255 to oscillate about its axis as the meter drive sprocket 240 revolves. Agitator pins 260 extend through the agitator shaft 255 and engage product within the product disconnect chamber 115 to prevent the product from bunching together and to encourage steady product flow.

Although the preferred embodiment uses a combination of shaft and chain drives, other methods of transferring power are known to those skilled in the art.

Referring now to FIGS. 6 and 9, the product disconnect 65 is rotatably secured in the product disconnect chamber 115 by the left and right end plates 95, 100 of the meter housing 60. The product disconnect 65 comprises a pair of rotary cutoff valves 265 and a product disconnect handle 270 connected to each rotary cutoff valve 265. At their interior ends, the rotary cutoff valves 265 abut cutoff valve bearings 269 which are fixed in the housing 60. A handle locator guide 267 is fixed between the product disconnect handles 270 to enable an operator to easily determine whether each product disconnect handle 270 is in an open position or a closed position. A flexible seal 192 is mounted to the meter housing 60 between the meter chamber 125 and the product cleanout chamber 120. The agitator shaft 255 (shown in FIGS. 7, 8) extends through the rotary cutoff valves 265 along the axis of rotation of the rotary cutoff valves 265. By raising the product disconnect handles 270, rotary cutoff valves 265 are rotatable from the open position, allowing product to pass into the meter chamber 125, to the closed position, which shuts off passage of product into the meter chamber 125 and instead directs product to the product cleanout chamber 120. Therefore, an operator can place the rotary cutoff valves 265 of the product disconnect 65 in their closed position, remove the meter cartridge 70 from the meter housing 60 and reconfigure meter rollers 145 or replace the meter cartridge 70 with another meter cartridge 70 pre-configured for a desired seeding plan.

Use of two rotary cutoff valves 265, each extending half the width of the product entrance slot 80 of the meter housing 60, allows the operator to disconnect none, half or all of the metering system 30 from the product tank 20 above the product disconnect 65. Additional rotary cutoff valves 265 may be incorporated to enable disconnection of smaller portions of the width of the metering system 30 (for instance, eight rotary cutoff valves 265 could be used across the width of the metering system 30 in the present example, each rotary cutoff valve 265 representing one meter roller 145 and one run in the pneumatic distribution system 35.

Referring now to FIG. 10, the meter roller 145 according to the present invention is shown having a series of ridges 275 defining product receiving valleys 280. The meter roller 145 has a product carrying volume equal to the sum of volumes of the product receiving valleys 280. Additionally, the meter roller 145 has a hexagonal bore 285.

Although the meter rollers 145 may be made of virtually any material, a urethane plastic is preferable, and compound No. GC3501 durometer 90 R +/−5 impact modified 66 nylon is the most preferred material for the meter rollers 145. If the meter rollers 145 are made of urethane, thermal expansion during operation may present unnecessary friction and wear of components of the metering system 30. Therefore, an axial retainer shaft 290 with a hexagonal outer surface conforming to the hexagonal bore 285 of the meter roller 145 is preferably provided. The axial retainer shaft 290 is constructed of material having a lower coefficient of thermal expansion than the material making up the meter roller 145. Preferably, the axial retainer shaft is constructed of GC3280 80D+/−5 40% glass and mineral polyester polyurethane. The axial retainer shaft 290 has a hexagonal retainer shaft bore 295 for receiving the meter drive shaft 150. The axial retainer shaft 290 extends through the meter roller 145 and is provided at its ends with bearing plates 300 which abut the meter roller 145 and are fixed to the axial retainer shaft 290 by snap rings 305. Preferably the axial retainer shaft 290 is provided with bearing plate engagement pegs 310 which extend into corresponding notches 315 in the bearing plates 300 so that each bearing plate 300 rotates with the meter roller 145 it is abutted against, preventing heat and wear caused by excess friction. The casing section 140 which abuts the bearing plate 300 on the side opposite the meter roller 145 and does not rotate with the bearing plate 300, should be constructed of a material which exhibits a low coefficient of friction and good wear characteristics, preferably GC3240 121R +/−5 40% glass and mineral filled nylon 6 heat stabilized.

To reduce the amount of product metered by a meter roller 145 (and therefore, the amount of product delivered by distribution lines 320 to a downstream secondary distribution header 325 on the tilling implement 10), a blank section 330 may be added to the meter roller 145. Referring now to FIG. 10, the blank section 330 may be placed over the meter roller 145 to occupy space in the product receiving valleys 280 of the meter roller 145. The blank section 330 is slid axially along the roller 145 to the center of the roller 145 for optimal product flow. Preferably, holding ribs 335 extend radially inward from an interior surface 340 of the blank section 330 to engage the meter roller and provide additional friction to keep the blank section 330 from moving axially along the meter roller 145 after the blank section 330 is positioned. Various size blank sections 330 may be used depending on the amount of space to be occupied, but preferably the blank section 330 conforms to the cross-section of the meter roller 145 (meter rollers 145 have varying cross sections and product carrying volume, generally selected based on the product to be metered).

Figure 7:
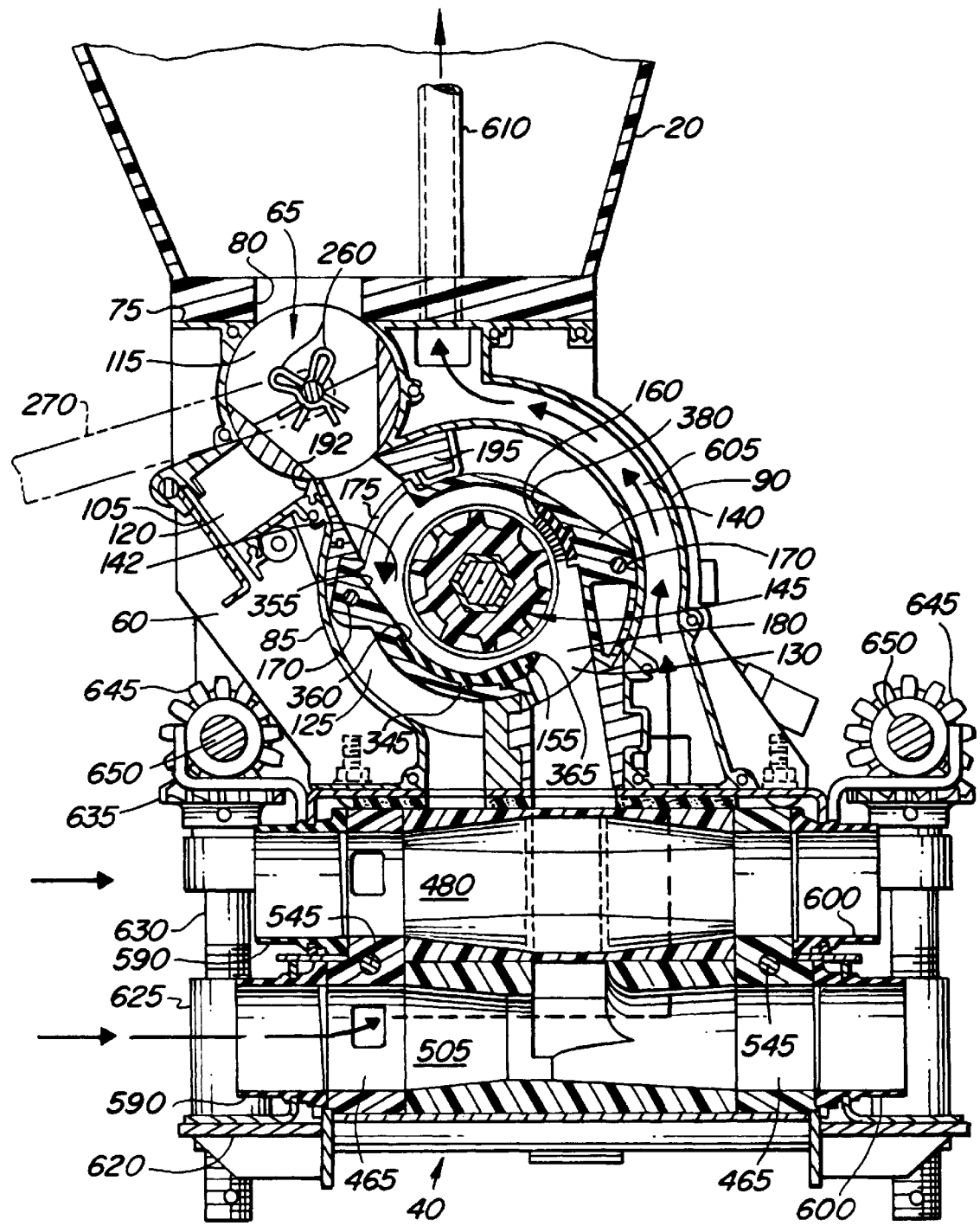
FIG. 7 is a cross sectional view of a metering system and a primary distribution manifold.
Figure 11A:
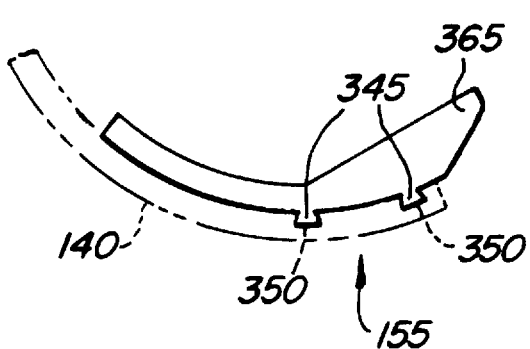
FIG. 11a is a side view of a wear insert according to a preferred embodiment of the present invention.
Figure 11B:
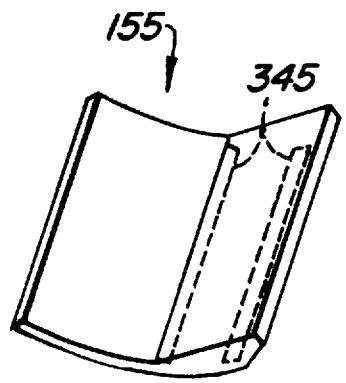

Referring now to FIGS. 7, 11a and 11b, the wear insert 155 is fixed in each of the casing sections 140 below the meter roller 145. The wear insert 155 includes fastening protrusions 345 which snap into corresponding dovetail notches 350 in an internal wall 355 of casing section 140 to provide a friction fit within the casing section 140. Preferably, the casing section 140 is provided with a wear insert step 360 so that product may more easily flow along the inner wall 355 of the casing section 140 over the wear insert 155 and through the casing outlet 180. The thickness of the wear insert 155 may be varied to affect the distance between the wear insert 155 and the meter roller 145, thus affecting the rate at which product is metered from the metering system 30. The wear insert 155 has a lip 365 which extends partially over the casing outlet 180, thereby directing rising air flow away from product being metered and toward the urethane meter roller brush 160. The wear insert 155 may be removed and replaced when worn or when the operator wishes to alter the characteristics of the metering system 30.

Figure 12A:
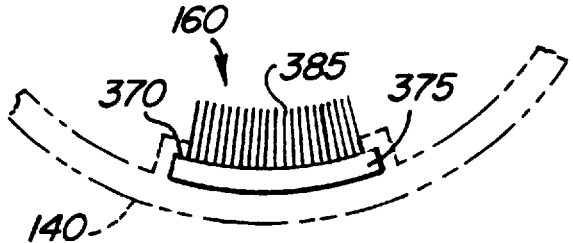
FIG. 12a is a side view of a meter roller brush according to a preferred embodiment of the present invention.
Figure 12B:
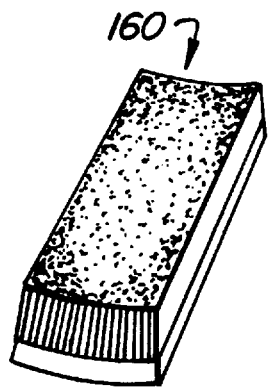

Referring now to FIGS. 7, 12a and 12b, the meter roller brush 160 is mounted in each casing section 140, extending between the inner wall 355 of the casing section 140 and the meter roller 145. The meter roller brush 160 is removably fixed to the casing section 140 by sliding the meter roller brush 160 into the casing section 140 so that L-shaped tabs 380 in the casing section 140 engage a top face 370 of a meter roller brush base 375. The meter roller brush 160 has a plurality of bristles 385 extending from the meter roller brush base 375 for providing a barrier that product can't pass through, while allowing air to pass. Preferably, the bristles 385 have varying rake angles, beginning at 5–10 degrees at each side and converging. The meter roller brush 160 increases metering accuracy by preventing product from flowing up through the meter cartridge 70, as it is prone to do when air pressure in the product tank 20 above is too low.

The pneumatic distribution system 35 includes a centrifugal fan 390 which is connected to a plenum 400, which is in turn connected by distribution lines 320 to one or more primary distribution manifolds 40, each associated with a product tank 20. The primary distribution manifolds 40 are connected by distribution lines 320 to a dimpled riser tube 405 which is coupled to one of the secondary distribution headers 325. Distribution lines 323 connect the secondary distribution header 325 to seed boots 410 mounted on the ground openers 50.

The pneumatic distribution system 35 is shown as having generally two rows of distribution lines 320 and ports in the primary distribution manifold 40, representing separate air streams such that the product from separate product tanks 20 are not commingled as they are carried pneumatically from the product tanks 20 to the tillage. This arrangement is commonly referred to as "double shoot". Alternatively, the pneumatic distribution system 35 may be configured as a singular air stream where only one product tank 20 is involved or products from separate product tanks 20 are commingled as they are delivered to the tillage. Such a configuration is referred to as "single shoot." The single shoot configuration would require only half the distribution lines 320 and secondary distribution headers 325, and only one row of ports on the primary manifold(s) 40.

Figure 19:
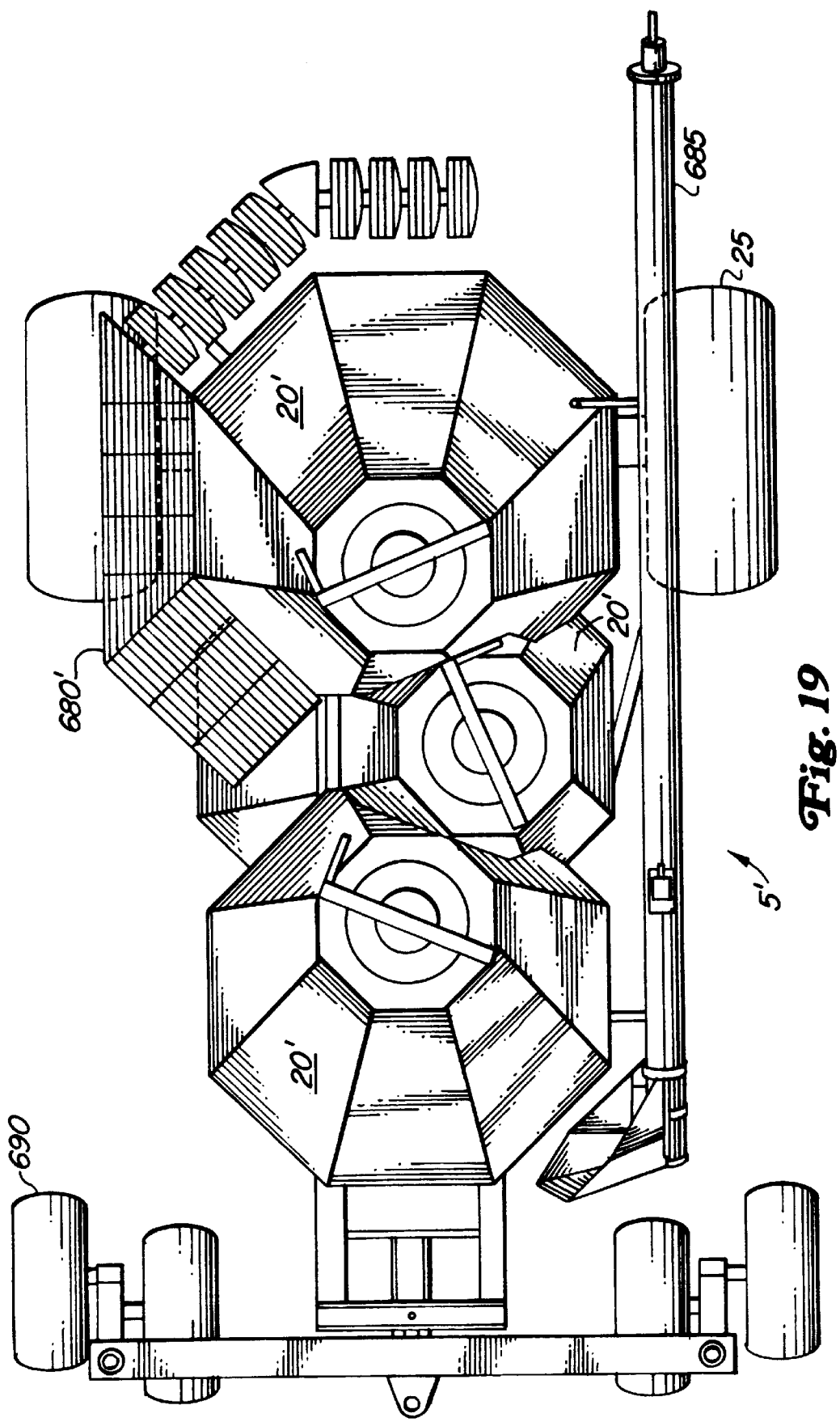
FIG. 19 is a plan view of an air seeder in a tow-behind configuration according to an alternate embodiment of the present invention.

The air seeder is also adaptable to a triple-shoot configuration by adding another product tank 20' as shown in FIG. 19, and an additional air stream (an additional set of distribution lines 320', secondary distribution headers 325 and seed boots 410, as well as another row of ports in the primary distribution manifolds 40').

Referring now to FIG. 13, to create two generally separate air streams in the double shoot configuration, air from the centrifugal fan 390 is passed through the plenum 400, where a plenum damper 415 directs a desired proportion of air to upper and lower rows of plenum output ports 420, such that each plenum outlet port 420 in a row has substantially the same amount of air flowing through it. The plenum damper 415 is fixed in the plenum 400 by a threaded damper shaft 425 threaded through an internally threaded sleeve 426 fixed in the plenum damper 415. A damper shaft crank 430 is connected to the damper shaft 425 so as the damper shaft crank 430 is turned, the damper shaft 425 rotates and the plenum damper 415 may be raised or lowered to provide the desired amount of air to each row of plenum output ports 420. A plenum damper guide rod 427 and sleeve 428 extend through the plenum damper 415 to prevent the plenum damper 415 from rotating as it is raised or lowered.

Each column of plenum output ports 420 and associated downstream distribution lines 320 represents a "run", and corresponds to placement of product at a particular portion of the width of the tillage. A distribution line 320 is connected to each plenum output port 420 in use by a hose clamp 435. Plenum outlet ports 420 for runs not in use are closed off by caps 440. The air seeder shown in the appended Figures is in an eight run, double shoot configuration.

Figure 14:
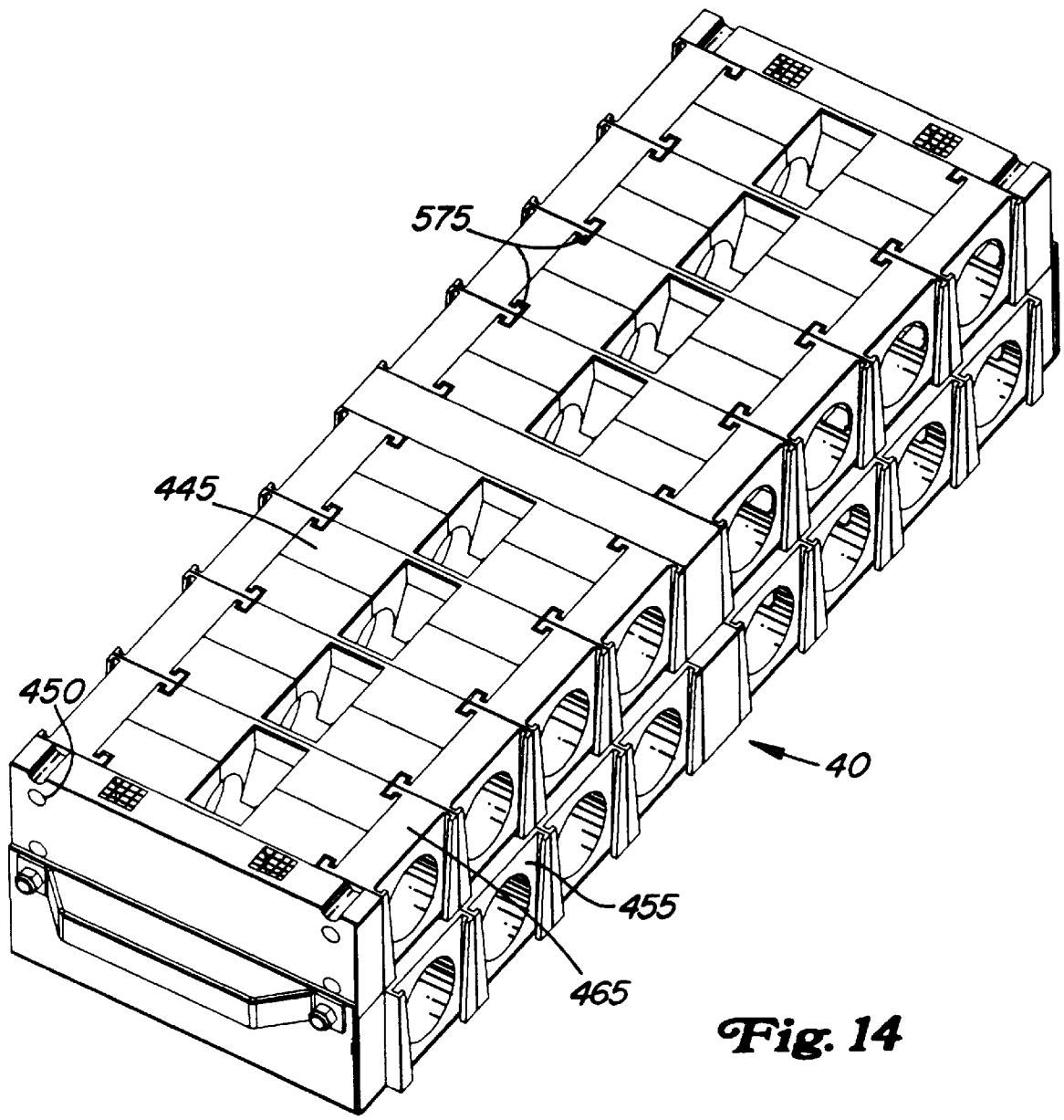
FIG. 14 is a perspective view of a primary distribution manifold according to a preferred embodiment of the present invention.
Figure 15:
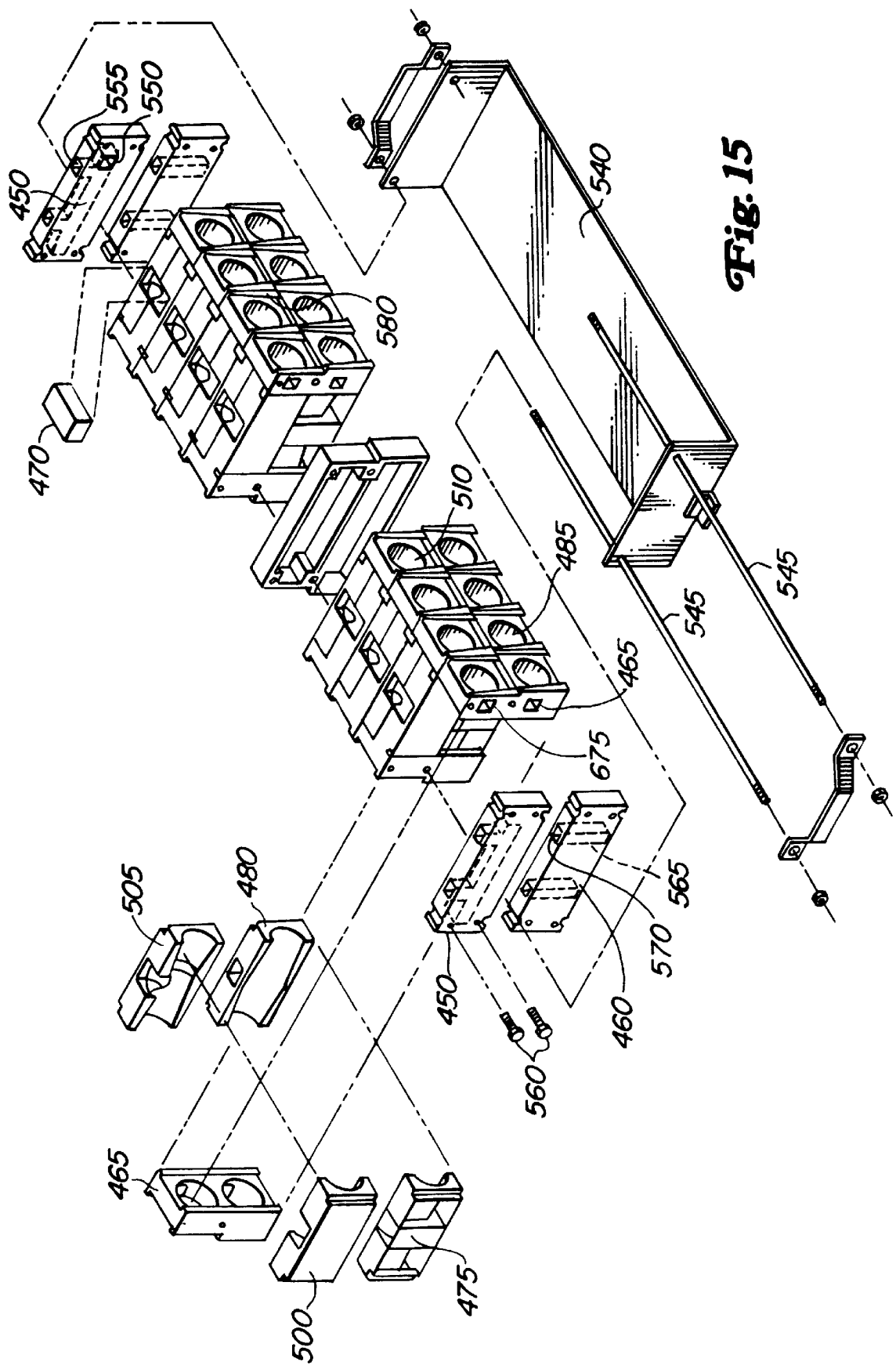
FIG. 15 is a partially exploded view of the primary distribution manifold of FIG. 14.

Referring now to FIGS. 14–15, the primary distribution manifolds 40 in an eight-run, double shoot configuration are each made up of eight columns and two rows of manifold ports, one row having eight venturi ports 445 and having a venturi pressure plate 450 at each end of the row, and another row having eight bypass ports 455 and a transfer pressure plate 460 at each end of the row. Manifold nozzles 465 are positioned at the front and rear of each of the venturi ports 445 and the bypass ports 455. A cover 470 may be used to deny product to one of the venturi ports 445 or one of the bypass ports 455 when a run associated with that port is not in use.

Figure 16A:
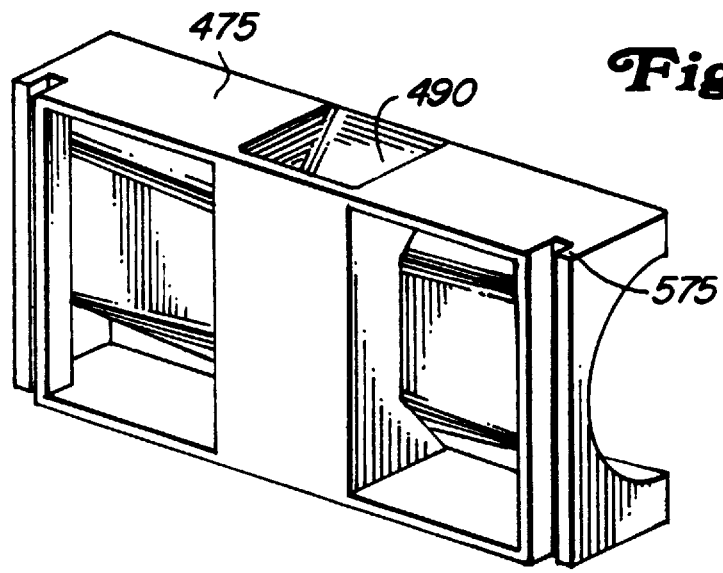
FIG. 16a is a perspective view of a left bypass port half according to a preferred embodiment of the present invention.
Figure 16B:
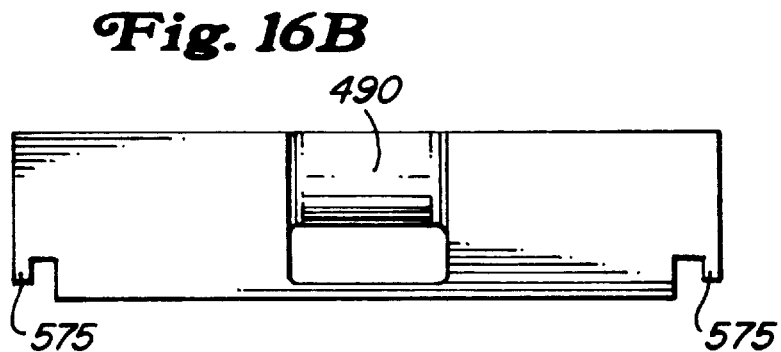
Figure 16C:
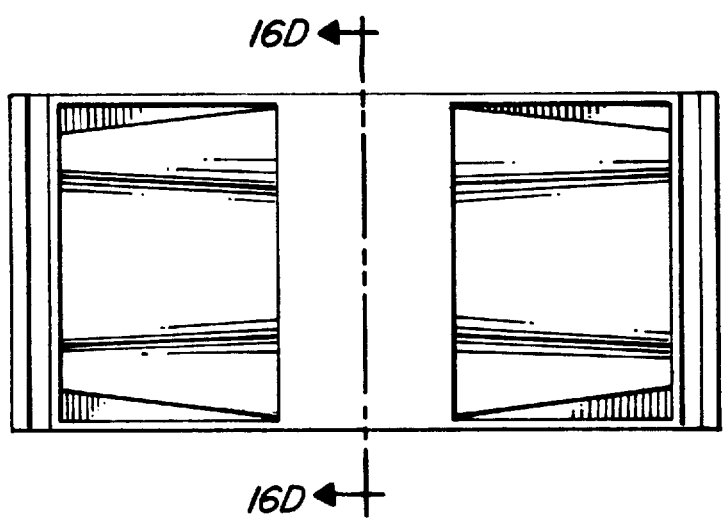
Figure 16D:
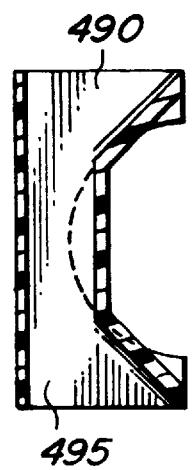
FIG. 16d is a sectional view of a left bypass port half taken along line d—d in FIG. 16c.
Figure 17A:
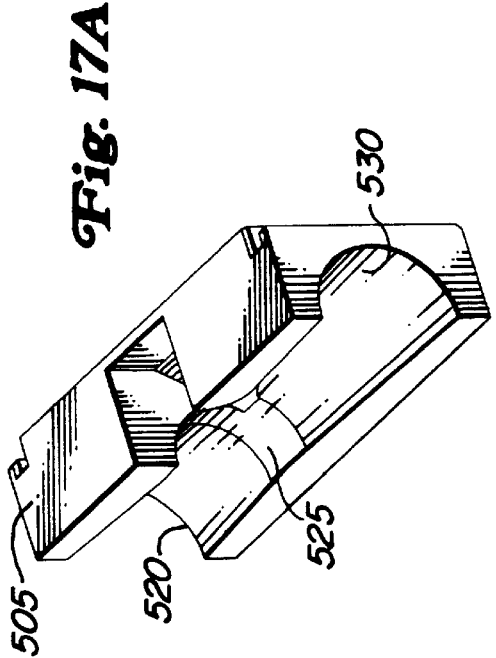
FIG. 17a is a perspective view of a right venturi port half according to a preferred embodiment of the present invention.
Figure 17B:
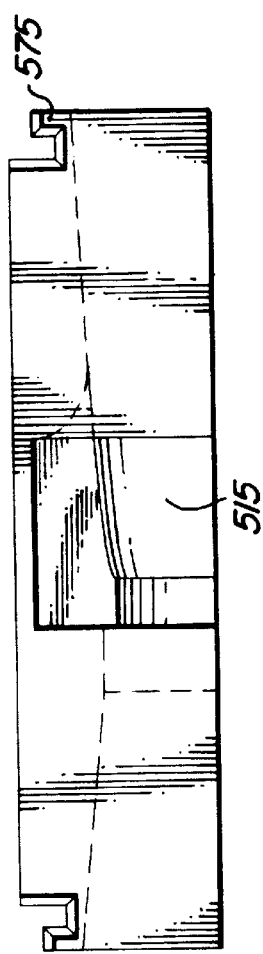
Figure 17C:
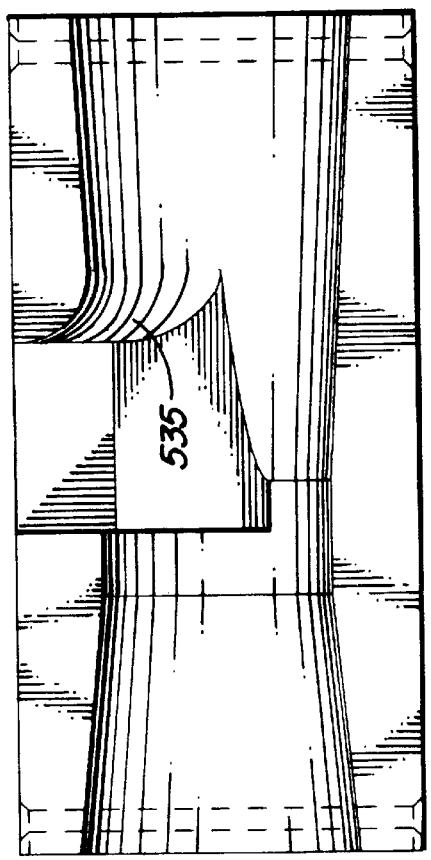

Referring now to FIGS. 15–16d, the bypass ports 455 are made up of left and right bypass port halves 475, 480. The left and right bypass port halves 475, 480 are identical molded pieces which are positioned opposite each other to form the bypass port 455, which comprises a product throughway 485, a bypass inlet 490 and a bypass outlet 495. Referring now to FIGS. 15, 17a–17c, the venturi ports 445 are made up of left and right venturi port halves 500, 505, which are mirror images of each other and are positioned against each other to form the venturi port 445 having an air passage 510 and a product inlet 515. The air passage 510 in the venturi port 445 preferably constricts from a main venturi port air inlet 520 having a diameter 2.5 inches to a diameter of 1.9685 inches (50 millimeters) at a venturi 525 below the product inlet 515 to provide a desired pressure reduction for optimal flow of product from the meter housing 60 into the primary distribution manifold 40. Downstream from the product inlet 515, the air passage 510 expands from a 1.9685 inch diameter to a 2.5 inch diameter at a main venturi port outlet 530. A rounded edge 535 at the downstream side of the product inlet 515 improves product flow and reduces damage to product as it enters the venturi port 445.

Rows of the bypass ports 455 and the venturi ports 455 are held together and positioned on a manifold support plate 540 by a pair of manifold rods 545 which extend through the manifold nozzles 465.

The venturi pressure plates 450 have a nozzle-side orifice 550 and a meter-side orifice 555 and are secured to the ends of rows of venturi ports 445 by screws 560. The transfer pressure plates 460 have a lower transfer orifice 565 and an upper transfer orifice 570 and are similarly attached to each end of a row of the bypass ports 455 by screws 560.

The left and right bypass port halves 475, 480 are held together by interlocking tabs 575 on the left and right bypass port halves 475, 480 and on the manifold nozzle 465 which is slid over the left and right bypass port halves 475, 480. The manifold nozzles 465 are two rows high in the double shoot configuration and similarly engage interlocking tabs 575 on the left and right venturi port halves 500, 505 on the row of the primary distribution manifold 40 made up of the venturi ports 445.

Figure 18:
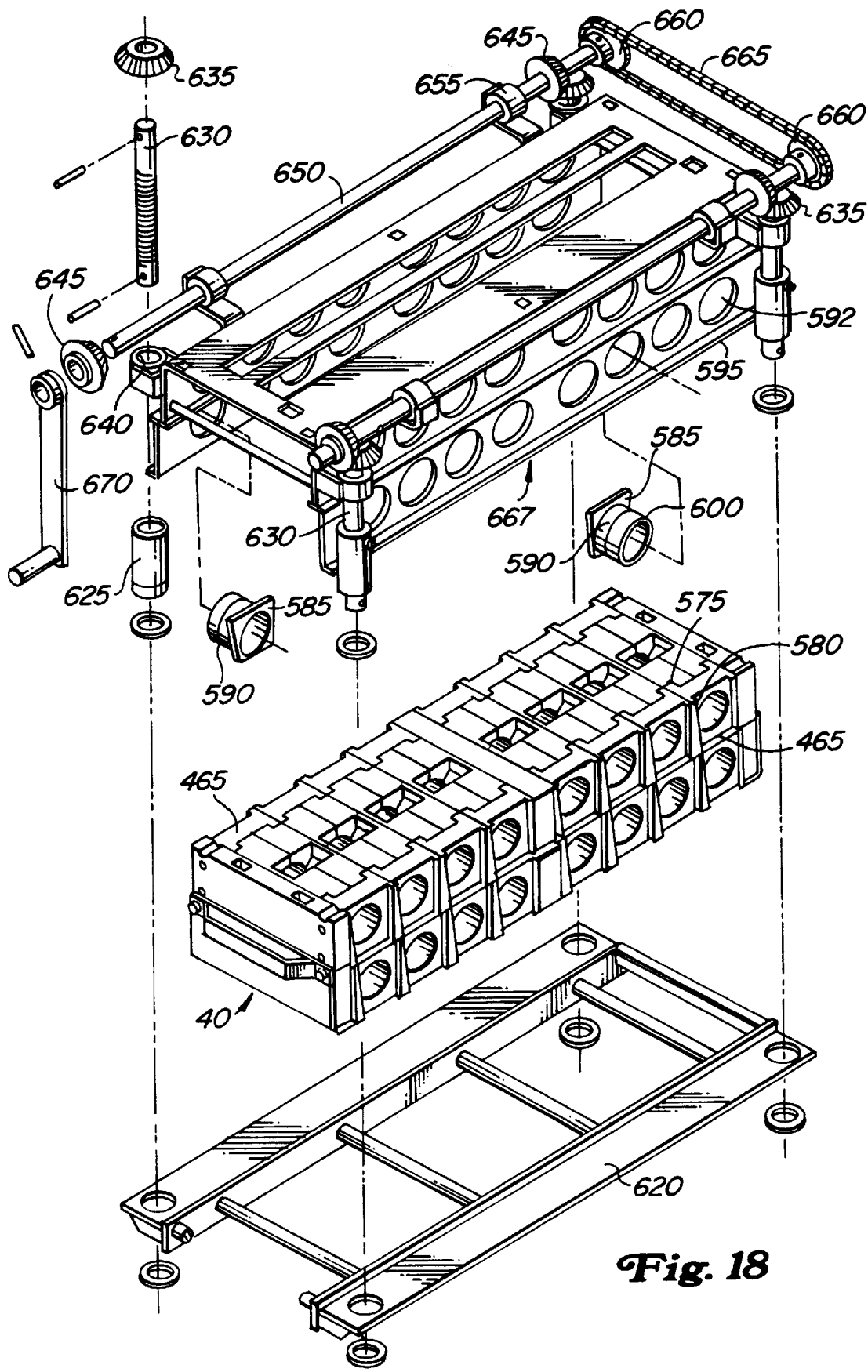
FIG. 18 is an exploded view of a manifold adjustment mechanism according to a preferred embodiment of the present invention.

Referring now to FIGS. 15 and 18, on a side each of the manifold nozzles 465 opposite the interlocking tabs 575, a tapered slot 580 is provided for accommodating a face side 585 of a manifold nozzle seal 590. In the double shoot configuration, two rows of tapered slots 580 are provided which are offset (shown in FIGS. 7, 14, 15 and 18). The manifold nozzle seals 590 extend through openings 592 in a manifold conduit support 595 mounted to the frame 15, and are coupled at their tube sides 600 to distribution lines 320.

Preferably, various orifices in transfer pressure plates 460, venturi pressure plates 450 and manifold nozzles 465 are screened to keep product from entering.

Each product tank 20 is pressurized by air from the centrifugal fan 390. The meter housing 60 is provided with an air passage 605 (shown in FIG. 7) for directing pressurized air from the air stream in the primary distribution manifold 40, upstream from the venturi 525, to hollow legs 610 of the product tank ladder 615 (shown in FIGS. 1 and 7), which in turn conduct the pressurized air to the product tank 20 above the meter housing 60. This results in substantially equal pressure above and below the product, urging the product to enter the underlying air stream of the pneumatic distribution system 35. However, the product tank 20 must be sealed correctly during operation to assure accurate product delivery and to avoid "pulsing," an undesirable condition where product is delivered in disjointed batches rather than in a more continuous flow.

Referring now to FIG. 18, in the preferred embodiment of the invention, the primary distribution manifold 40 is situated on a rectangular manifold support frame 620. At each corner of the manifold support frame 620 is fixed an internally threaded cylinder 625. A threaded vertical manifold adjustment shaft 630 having a beveled gear 635 at its upper end is threaded through each internally threaded cylinder 625 and extends through vertical bushings 640 mounted to the manifold conduit support 595. The four beveled gears 635 each engage one of four further beveled gears 645. The further beveled gears 645 are fixed at opposite sides of two transverse manifold adjustment shafts 650. The transverse manifold adjustment shafts 650 extend through transverse bushings 655 fixed to the manifold conduit support 595 and are each also provided with a rear sprocket 660 fixed to an end of the transverse manifold adjustment shaft 650. The two rear sprockets 660 are connected by a chain 665, and a manifold adjustment crank 670 is fixed to an end of one of the transverse manifold adjustment shafts 650 opposite the rear sprocket 660.

When the manifold adjustment crank 670 is turned, the transverse manifold adjustment shaft 650 to which the manifold adjustment crank 670 is fixed rotates, and the beveled gears 635, 645, the rear sprockets 660 and the chain 665 comprise a manifold adjustment mechanism 667 which produces substantially uniform rotation of the vertical manifold adjustment shafts 630 causing the primary distribution manifold 40 and manifold support frame 620 to be raised or lowered evenly. During operation, the primary distribution manifold 40 is maintained in a fully raised, engaged position. When the primary distribution manifold 40 is lowered from its engaged position, manifold nozzles 465 slide away from contact with manifold nozzle seals 590, which maintain their position in the manifold conduit support 595. When the primary distribution manifold 40 is lowered, it may be slid from the manifold support frame 620 for cleaning and/or replacement. When the primary distribution manifold 40 is raised into its engaged position, the manifold nozzle seals 590 are guided by the tapered slots 580 of the manifold nozzle 465 to form a substantially airtight connection from the primary distribution manifold 40 to upstream and downstream distribution lines 320. In the double shoot configuration, top and bottom rows of the openings 592 in the manifold conduit support 595 are offset, conforming to a matching offset in the tapered slots 580 of the manifold nozzle 465. This offset allows the top row of tapered slots 580 to engage only the top row of manifold nozzle seals 590, and the bottom row of tapered slots 580 to engage only the bottom row of manifold nozzle seals 590 as the primary distribution manifold 40 is raised into its engaged position.

Next, the operation of an air seeder incorporating the preferred embodiment of the present invention will be discussed in greater detail.

During operation of the metering system 30, product is drawn (by gravity and low pressure airflow through the venturi ports 445) from the product tank 20 into the meter housing 60 through the product entrance slot 80 into the product disconnect chamber 115. While in the product disconnect chamber 115, product is prevented from bunching together by the agitator pins 260 of the agitator shaft 255 which rotates through the product in the product disconnect chamber 115.

If one of the rotary cutoff valves 265 is in a closed position, product encountering the rotary cutoff valve 265 is prevented from passing into the meter chamber 125 and is instead directed to the product cleanout chamber 120. Therefore, meter rollers 145 and runs serviced by the rotary cutoff valve 265 are denied product and essentially no product from the product tank 20 will be delivered to the tillage by the disconnected runs. If both of the rotary cutoff valves 265 of the product disconnect 65 are in their closed position, substantially all of the product is prevented from entering the meter chamber 125 and essentially no product from the product tank 20 will be delivered to the tillage. Instead, product is diverted to the product cleanout chamber 120, and the operator can open the cleanout doors 105 to empty the product tank 20 without sending product through the remainder of the metering system 30.

If both rotary cutoff valves 265 are in their open position, product will pass into the meter chamber 125 and enter the meter cartridge 70 through the casing inlet 175. The rotational speed of the meter rollers 145 may be varied in order to achieve a desired seed rate. By adjustments at ratio boxes 220 to change the rate of rotation of the transverse shaft 225 relative to main drive shaft 215, meter rollers 145 in metering systems 30 for separate product tanks 20 can be driven at different rates. As the meter rollers 145 rotate they carry product in their product receiving valleys 280 to the casing outlet 180, where the product is drawn into an air stream at the primary distribution manifold 40. Product is prevented from flowing upward through the casing 135 by the meter roller brushes 160 and the wear inserts 155.

Meanwhile, the centrifugal fan 390 is driven by the tractor's hydraulic system (not shown), forcing pressurized air through the pneumatic distribution system 35. Air travels from the centrifugal fan 390 to the plenum 400, where air is diverted by the plenum damper 415 through the plurality of plenum output ports 420. The distribution lines 320 carry the air to a primary distribution manifold 40.

When product from the product tank 20 above the primary distribution manifold 40 is to be deposited in the top row of ports, venturi ports 445 are used to make up the top row of ports in the primary distribution manifold 40, with venturi pressure plates 450 at the sides of the top row. Product is metered into the primary distribution manifold 40 at the product inlet 515. Some of the pressurized air from the pneumatic distribution system 35 is taken in the top row of ports just before the venturi 525 by a tank pressure orifice 675 (shown in FIG. 15) in the outermost manifold nozzles 465 (those adjacent to the venturi pressure plates 450) to the venturi pressure plates 450 at the end of the top row. The air enters the venturi pressure plate 450 at the nozzle-side orifice 550 and is conducted to the meter-side orifice 555, where it passes into the meter housing 60. Air is then conducted through air passage 605 of the meter housing 60 into hollow legs 610 of the product tank ladder 615 mounted above the meter housing 60. Finally, the air carries to top of the product tank ladder 615 where it is dispensed into the product tank 20.

When product from the product tank 20 above one of the primary distribution manifolds 40 is to be deposited in the bottom row of ports, bypass ports 455 are used to make up the top row of ports in the primary distribution manifold 40, with transfer pressure plates 460 at the sides of the top row. Product is metered into the primary distribution manifold 40 at the bypass inlets 490 of the bypass ports 455, where it is diverted around the product throughways 485 and falls through the bypass outlets 495 into the product inlets 515 of the bottom row venturi ports 445. Some of the pressurized air from the pneumatic distribution system 35 is taken by tank pressure orifices 675 in the outermost manifold nozzles 465 on the bottom row. The air is carried to the venturi pressure plate 450 at the end of the bottom row. The air enters the venturi pressure plate 450 at the nozzle-side orifice 550 and exits at the meter-side orifice 555, where it is conducted into the transfer pressure plate 460, entering at the lower transfer orifice 565 and exiting at the upper transfer orifice 570. Air passes from the upper transfer orifice 570 into the meter housing 60, continues through the air passage 605, through the legs 610 of the product tank ladder 615 and into the product tank 20.

Air and product flow in the pneumatic distribution system 35 from the primary distribution manifold 40 through distribution lines 320 to the dimpled riser tubes 405 which attempt to randomize distribution of product from the secondary distribution headers 325 which are immediately downstream. The secondary distribution headers 325 divide the product substantially evenly into a series of the distribution lines 323 leading to the seed boots 410 on the ground openers 50 where product is delivered to the tillage.

To change placement of product in soil without reconfiguring downstream distribution lines, an operator can place the product disconnect 65 in its closed position so that no product will be metered. The operator can then exchange primary distribution manifolds 40 such that product from a particular product tank enters the primary distribution manifold 40 at a different row of venturi ports 445 or bypass ports 455, and is carried by distribution lines 320 to the tillage at a different location. For example, if product is replaced with a larger grain to be metered, an operator can remove the meter cartridge 70 and replace it with a separate meter cartridge 70 with meter rollers 145 having larger product receiving valleys 280. If instead an operator switches from an application where more fertilizer is needed than seed to an application where more seed is needed than fertilizer and one of the product tanks 20 is larger than the other, the operator can reduce the number of stops required to fill product tanks 20 by removing the primary distribution manifolds 40 below the product tanks 20 and exchanging them to reverse the location of venturi ports 445 and bypass ports 455. This exchange results in seed and fertilizer placed at the same location in the tillage as they were in the previous application without having to reconfigure distribution lines 320.

If, however, the operator wishes to change the width of the tillage or has changed the setup of the tilling implement 10, the operator can shut off one or more runs by placing caps 440 on a column of plenum output ports 420, inserting the door insert 165 into the casing inlet 175 to cut off the casing section 140 associated with the run, and placing a cover 470 on the product inlet 515 of the venturi port 445 or over the bypass inlet of the bypass port 455 (whichever is located in the top row of ports in the primary distribution manifold 40). If the number of seed boots 410 serviced by the metering system 30 and the pneumatic distribution system 35 has been reduced but still require the same number of runs, the operator can remove one or more of the meter cartridges 70 and replace them with meter cartridges 70 preconfigured for the setup of the tilling implement 10, or can reconfigure the meter cartridges 70 by adding blank sections 330 to one or more meter rollers 145 to reduce the capacity an individual run.

Preferably, the air seeder is equipped with a platform 680 (shown in FIG. 2) for the operator to stand on when loading product into the product tanks 20 and inspecting the product tanks 20.

Also, an electronic seed monitor of known design (not shown) may be included to warn the operator if one of the seed boots 410 is plugged, warn the operator if product level in one of the product tanks 20 is low, and calculate the number of acres seeded. A tone wheel 196 (shown in FIG. 3) may be helpful to monitor the rate of rotation of the meter rollers 145 in one of the metering systems 30.

In addition, an auger 685 of known design (shown in FIG. 1) may be mounted to the seed cart 5 for conveying product to the product tanks 20 and for conveying unused product from product tanks 20.

Referring now to FIG. 19, although the invention is discussed in terms of a preferred embodiment configured as a "tow-between" air seeder, the invention also contemplates a "tow-behind" arrangement in which the seed cart 5' is towed behind the tilling implement 10. The air seeder in a "tow-behind" arrangement includes additional casters 690 at the front end of the seed cart 5' to support load which is transmitted to the tractor through the tongue of the seed cart in the "tow-between" configuration. The operation of the air seeder in the "tow-behind" arrangement is substantially similar to that of the "tow-between" configuration; however, components are reversed such that the pneumatic distribution system 35' moves air and product from the rear of the seed cart 5' forward so that product is delivered to seed boots 410 on the tilling implement 10 in front of the seed cart 5'.

Further advantageous embodiments are given by the subordinate claims.

What is claimed is:

1. A metering system for metering product in an air seeder having a product tank and a pneumatic distribution system, said metering system comprising:

a meter casing having an inner wall, an inlet coupled to the product tank and an outlet coupled to the pneumatic distribution system such that the meter casing provides a substantially enclosed passage between the pneumatic distribution system and the product tank;

a meter roller rotatably mounted in the casing;

a plurality of open volumes between the meter and the inner wall of the casing connecting the inlet and the outlet, said plurality of open volumes including a product path for metering product from the inlet to the outlet and an air diversion path for permitting air flow from the pneumatic distribution system to the product tank; and a wear strip removably mounted on the inner wall of the casing and having a lip extending at least partially over the outlet.

2. The metering system of claim 1 wherein said lip is curved for directing air into the air diversion path for preventing the air from impeding flow of product through the metering system.

3. The metering system of claim 1 wherein the wear strip is made of urethane.

4. The metering system of claim 1 wherein fastening notches are provided in the inner wall of the meter casing, said wear strip includes fastening protrusions which frictionally engage the notches to secure the wear strip on the inner wall.

5. The metering system of claim 4 wherein the inner wall of the casing between the inlet and the outlet is stepped to receive the wear strip and provide a smooth product path.

6. The metering system of claim 5 wherein the lip of the wear strip is directed toward the meter roller to define a minimum area in the product path.

* * * * *